US009818004B1

(12) United States Patent
Rezayee et al.

(10) Patent No.: US 9,818,004 B1
(45) Date of Patent: Nov. 14, 2017

(54) ANTI-TAMPER CIRCUIT WITH INTERNAL LOCAL OSCILLATOR

(71) Applicant: Square, Inc., San Francisco, CA (US)

(72) Inventors: Afshin Rezayee, Richmond Hill (CA); Ravi Shivnaraine, Brampton (CA); Alain Rousson, Toronto (CA); Yue Yang, Thornhill (CA); Kajornsak Julavittayanukool, Toronto (CA)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/253,813

(22) Filed: Aug. 31, 2016

(51) Int. Cl.
*G06K 7/10* (2006.01)
*G06K 7/00* (2006.01)
(52) U.S. Cl.
CPC .................. *G06K 7/0095* (2013.01)
(58) Field of Classification Search
USPC ................................................. 235/439, 449
See application file for complete search history.

(56) References Cited

U.S. PATENT DOCUMENTS 7,837,110 B1 * 11/2010 Hess .................. G06K 7/08
235/449
9,665,870 B1 * 5/2017 Rezayee ............ G06Q 20/4012

* cited by examiner

*Primary Examiner* — Allyson Trail
(74) *Attorney, Agent, or Firm* — Maynard Cooper & Gale, LLP; Joshua V. Van Hoven, Esq.

(57) ABSTRACT

A payment reader includes an anti-tamper circuit for periodically providing control signals to tamper detection devices for detecting tamper attempts. The anti-tamper circuit includes a battery that drives a clock source. The clock source outputs a periodic signal to an enabling circuit and a pulse generator. The pulse generator provides enabling signal to an enabling circuit when it receives the periodic signal, and the enabling circuit provides an oscillator activation signal to a local oscillator when the enabling circuit receives the enabling signal and the periodic signal. The local oscillator provides an oscillating signal to the pulse generator, which utilizes the oscillating signal to exchange control signals with the tamper detection devices.

30 Claims, 8 Drawing Sheets

US 9,818,004 B1

ANTI-TAMPER CIRCUIT WITH INTERNAL LOCAL OSCILLATOR

BACKGROUND

Electronic payments may be performed in a variety ways. A payment terminal may process payment transactions, and may interact with payment devices such as a payment card having a magnetic strip that is swiped in a magnetic reader of the payment terminal, a payment device having a Europay/Mastercard/Visa (EMV) chip that is dipped into corresponding EMV slot of the payment terminal, and near field communication (NFC) enabled devices such as a smartphone or EMV card that is tapped to the payment terminal and transmits payment information over a secure wireless connection. The payment terminal may receive payment information from the payment device as well information about a transaction, and may communicate this information to a payment system for processing of the transaction.

As of a result of its central role in the transaction processing system, the payment terminal is a prime target for third party attackers attempting to access payment information, process fraudulent transactions, and otherwise engage in fraudulent activities or theft. In many cases, the attackers attempt to physically access components of the payment terminal, such as one or more communication lines carrying data or a processor that communicates and processes payment information. Attackers may attempt to eavesdrop on signals (e.g., a passive attack) or to modify or spoof payment processing communications (e.g., an active attack) by injecting malicious signals into the payment terminal.

In an effort to thwart physical attacks, payment terminals may implement tamper detection devices such temperature monitors, voltage monitors, tamper meshes and tamper switches. Such tamper detection devices may typically require an applied power source and related circuitry to operate, for example, to provide power to the tamper detection device and to monitor the tamper detection device. Attackers may attempt to tamper with a system while it is not powered or in a low power state in order to bypass the tamper detection devices, or to repair a tamper detection device prior to power being returned to the system.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
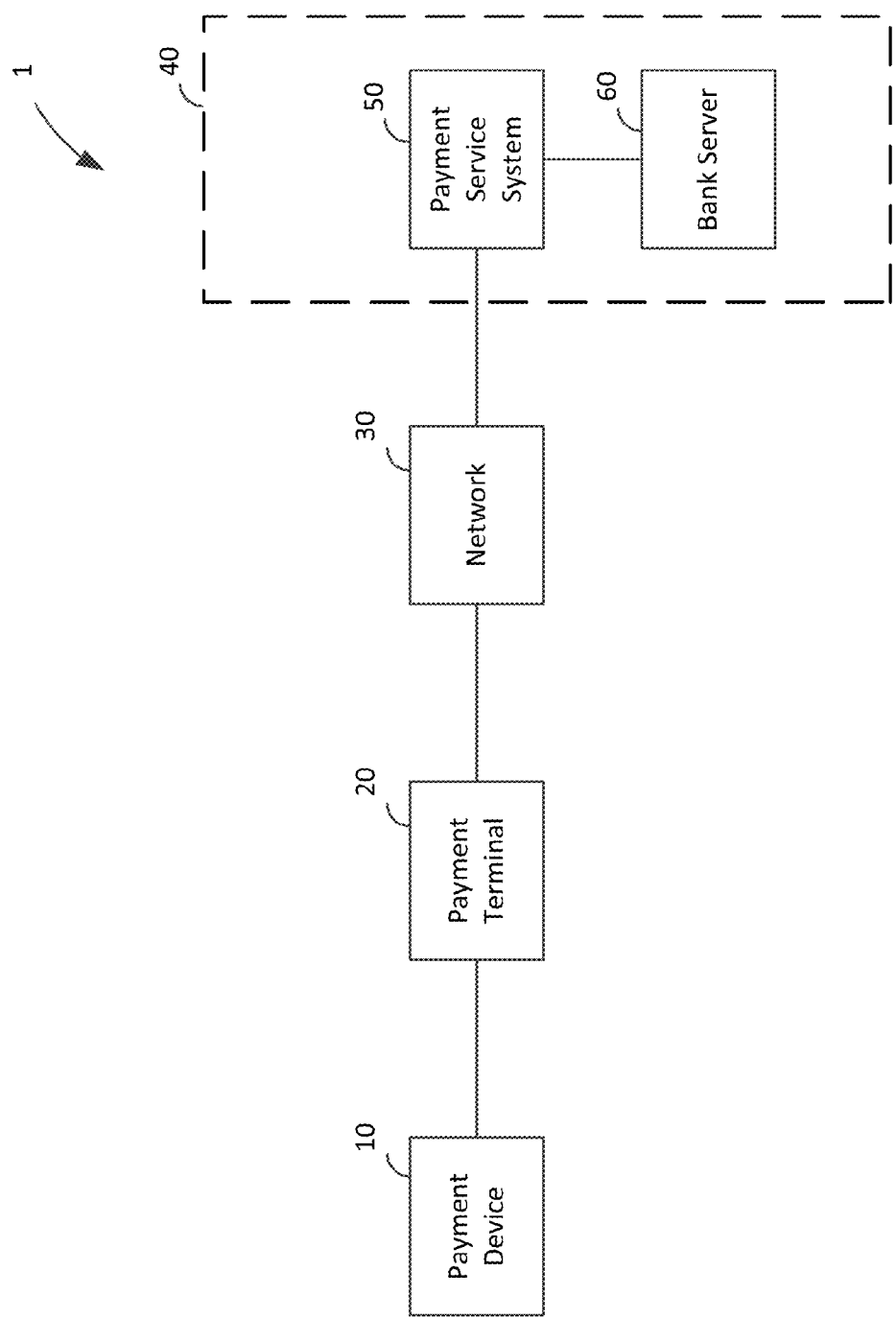
FIG. 1 shows an illustrative block diagram of a payment system in accordance with some embodiments of the present disclosure.

An electronic payment terminal such as a payment reader may interface with various types of payment devices. For example, smart phones and smart watches have NFC payment applications that allow a customer to "tap" in close proximity to the payment terminal in order to pay. Payment information is transmitted and received wirelessly over a radio frequency (RF) connection between the payment device and the payment reader. EMV cards include an EMV chip that is "dipped" into a slot in the payment reader. The EMV card typically remains in the reader, and communicates with the payment reader through a physical electrical connection. Once the transaction is complete, the EMV card may be removed. Also, many payment cards retain traditional "swipe" technology in which information about a payment card is transferred to the payment reader by swiping a magnetic card stripe through a magnetic reader of the payment reader.

In all of these scenarios, there are multiple opportunities for an attacker to attempt to obtain the payment information in order to steal payment data or otherwise engage in fraudulent transactions. For example, an attacker may attempt to intercept NFC communications, read data being communicated over the physical connections with the EMV card, or intercept that data from the magnetic stripe of a traditional swiping transaction. Moreover, signals carrying this and other critical information are transmitted within the payment reader and processed by processors and other circuitry of the payment reader.

Accordingly, numerous types of tamper detection devices such as temperature monitors and voltage monitors are integrated into an exemplary payment reader. These tamper detection devices can sense attempts to gain improper physical access to the payment reader (e.g., by opening the payment reader or drilling into the payment reader to access signals or components), attempts to physically provide electrical signals to the payment reader (e.g., attempts to inject malicious signals into externally accessible pins of the payment reader, such as EMV pins), and attempts to wirelessly introduce malicious signals to the payment reader. Some tamper detection devices may open a circuit in response to tamper attempt.

The payment reader includes anti-tamper circuitry for interacting with and controlling the various types of tamper detection devices. The payment reader may periodically monitor the anti-tamper circuitry for tamper attempts detected by a tamper detection device. The tamper detection devices may detect tamper attempts based on control signals from anti-tamper circuit. However, the control signals only may be provided to the tamper detection devices periodically, thus allowing the tamper detection devices to draw little or no power at other times. This may allow the payment reader to maintain a low average power consumption and lengthen an operating time of the payment reader.

In some embodiments, the anti-tamper circuitry may be powered by a small battery such as a coin battery. The battery may drive a clock source such as a real time clock that outputs a periodic signal when power is received from the battery. A pulse generator that generates control signals may provide an enabling signal to an enabling circuit. When the enabling circuit receives the enabling signal as well as a high portion of periodic signal from the clock source, the enabling circuit may provide an oscillator activation signal to a local oscillator. The local oscillator may activate and provide an oscillating signal to the pulse generator. The pulse generator provides control and monitoring signals to the tamper detection devices based on the frequency of the local oscillators, which enables the tamper detection devices to monitor for tamper attempts on a frequent periodic basis with minimal power consumption.

After an amount of time that is less than the high portion of the output of the real time clock, the pulse generator may stop providing the enable signal to the enabling circuit, which causes the local oscillator to turn off. The pulse generator in turn stops providing the control signals to the tamper detection devices when it no longer receives the oscillating signal, and may wait until the next time that the real-time clock transitions from low to high to provide the enabling signal again.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

In some embodiments, an attacker or other user may attempt to acquire payment information by monitoring transmissions or gaining access to components of payment system 1. As an example, each of these components of payment system 1 may provide an opportunity for an attacker to eavesdrop on payment and transaction information or to inject malicious signals. For example, an attacker may attempt to monitor signals that are relayed between any of payment device 10, payment terminal 20, network 30, and payment server 40. In some embodiments, transmissions sent or received by components of payment system 1 may be encrypted. In other attacks, an attacker may attempt to substitute a counterfeit component for one of the components of payment system 1, for example, by creating a counterfeit payment device 10 or payment terminal 20, or by attempting to intercept or redirect communications to network 30 or payment server 40. In yet other attacks, an attacker may attempt to modify one of the components of the payment system 1, for example, by modifying one or more of the payment device 10, payment terminal 20, or payment server 40 to eavesdrop or inject malicious signals. In this regard, the devices of payment system 1 may have any combination of hardware or software configured to prevent access or tampering.

Figure 2:
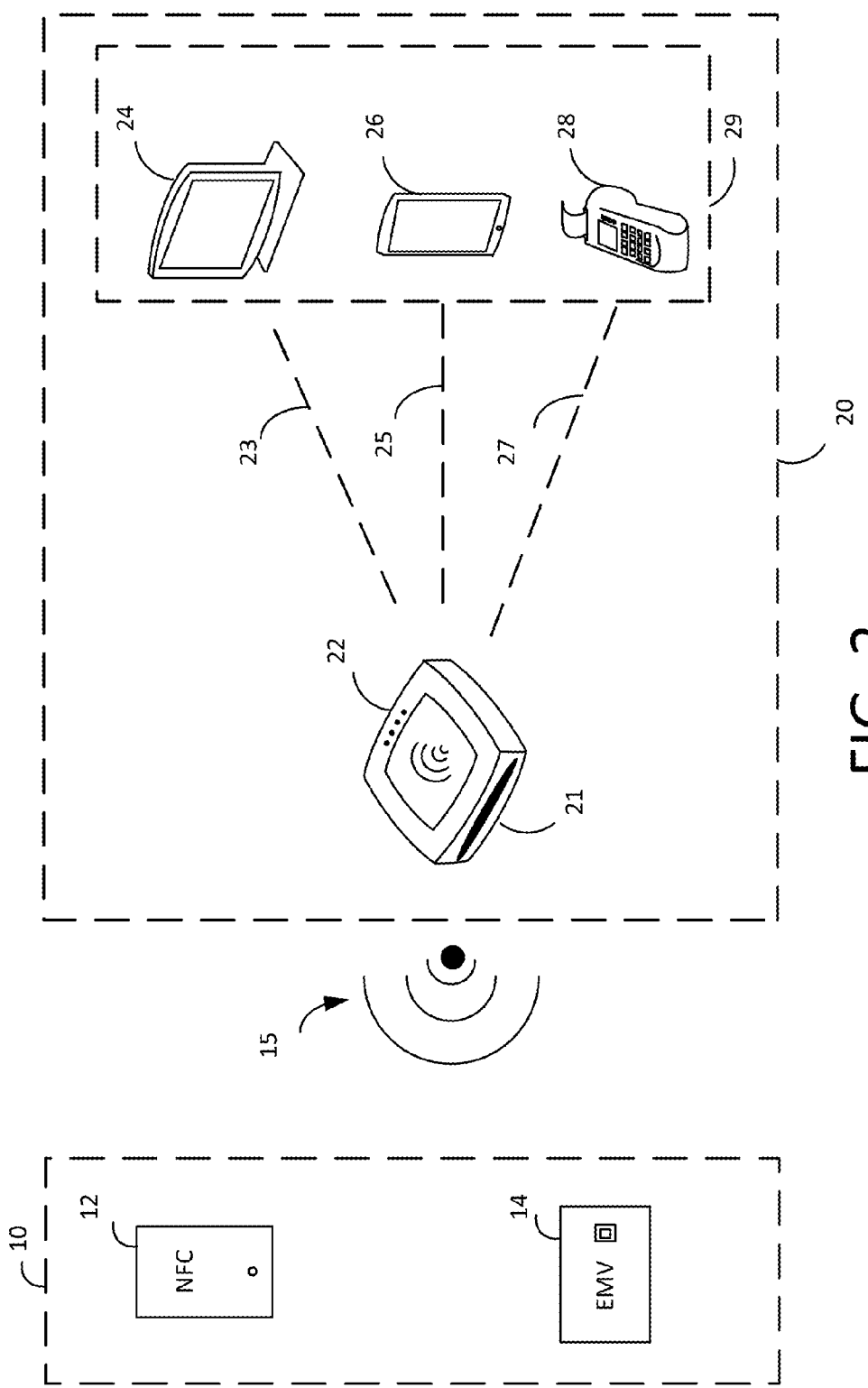
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
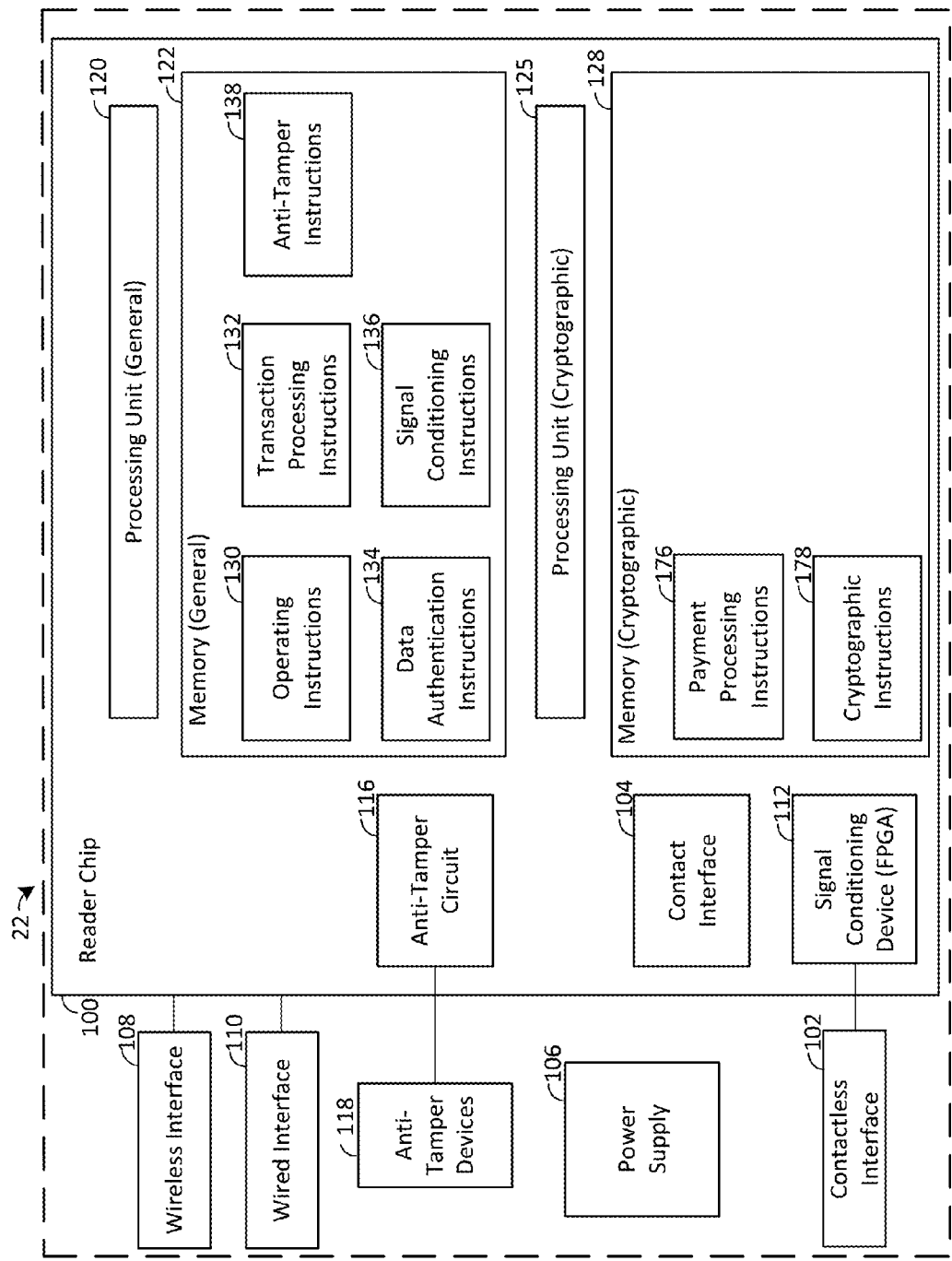
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. In one embodiment, payment reader 22 includes a reader chip 100, a plurality of payment interfaces (e.g., a contactless interface 102 and a contact interface 104), a power supply 106, a wireless communication interface 108, a wired communication interface 110, a signal conditioning device 112 and anti-tamper devices 118. In an embodiment, the reader chip 100 of payment reader 22 may include a general processing unit 120, general memory 122, a cryptographic processing unit 125 and cryptographic memory 128, an anti-tamper circuit 116, a contact interface 104, and NFC signal conditioning circuitry 112. Although in one embodiment the processing units memories, contact interface 104, signal conditioning device 112, and anti-tamper circuit 116 will be described as packaged in a reader chip 100, and configured in a particular manner, it will be understood that general processing unit 120, general memory 122, a cryptographic processing unit 125 cryptographic memory 128, contact interface 104, signal conditioning device 112, and anti-tamper circuit 116 may be located and configured in any suitable manner to perform the functionality of the payment reader 22 as is described herein. It will also be understood that the functionality of reader chip 100 may be embodied in a single chip or a plurality of chips, each including any suitable combination of processing units, memory, and other components to collectively perform the functionality of reader chip 100 described herein.

In some embodiments, reader chip 100 may be a suitable chip having a processing unit. Processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions provided from any suitable number of memories and memory types. In some embodiments, processing unit 120 may have multiple independent processing units, for example a multi-core processor or other similar component. In an embodiment, processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but do not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

In an exemplary embodiment, reader chip 100 may perform functionality relating to processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (e.g., general memory 122 and cryptographic memory 128). In this manner, specific cryptographic processing and critical security information (e.g., cryptographic keys, passwords, user information, etc.), may be securely stored by cryptographic memory 128 and processed by cryptographic processing unit 125.

One or both of general processing unit 120 and cryptographic processing unit 125 of reader chip 100 may communicate with the other (e.g., processing unit 120 may communicate with cryptographic processing unit 125 and vice versa), for example, using any suitable internal bus and communication technique. In this manner, reader chip 100 can process transactions and communicate information regarding processed transactions (e.g., with merchant device 29).

Reader chip 100 may also include circuitry for implementing a contact interface 104 (e.g., power and communication circuitry for directly interfacing with an EMV chip of a chip card 14 that is inserted into slot 21). In some embodiments, reader chip 100 also may also include a signal conditioning FPGA 112 and analog front end circuitry for interfacing with contactless interface 102 (e.g., electromagnetic compatibility (EMC) circuitry, matching circuits, modulation circuitry, and measurement circuitry).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card 14 are able to exchange information such as payment information. Note that, in some embodiments, contact interface 104 may be housed on reader chip 100 and may communicate with the various components of reader chip 100 via any suitable means (e.g., a common internal bus).

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components.

Payment reader 22 may provide an appealing target for an attacker, since, as described above, it provides a central point for receiving payment via multiple interfaces and for communicating that information with other devices (e.g., merchant device 29). Attackers may attempt to tamper with payment reader 22 in order to access internal electrical connections that carry signals to the various payment interfaces or communication interfaces, or processors or other circuitry of payment reader 22. Accordingly, payment reader 22 may include numerous mechanisms for monitoring and preventing attempts to tamper with the hardware of payment reader 22, such as anti-tamper devices 118. For example, in some embodiments, anti-tamper devices 118 of payment reader 22 may include tamper switches that change their electrical state in response to an attempt to open the housing of payment reader 22, insert a device other than a payment card into payment slot 21 or a magnetic stripe reader, place an improper device in proximity to the NFC interface of payment reader 22, or otherwise attempt to gain physical or electrical access to any components of payment reader 22.

In some embodiments, anti-tamper devices 118 may comprise a tamper switch, which may be a component that changes its electrical state in response to a physical stimulus. Exemplary tamper switches may be located at various locations of a payment reader 22, such that any attempt to open the enclosure of payment reader 22, or to modify the physical structure of payment reader 22, may cause the tamper switch to change its physical state (e.g., resulting in an open circuit).

In some embodiments, anti-tamper devices 118 may comprise a tamper switch that changes its electrical state in response to an electrical stimulus. An exemplary payment reader 22 may have a number of connection points at which it is possible to apply an electrical signal to the connection points. For example, in some embodiments a payment slot 21 (FIG. 2) of payment reader 22 may have EMV pins that interface with corresponding pins of an EMV card. An attacker may attempt to access those pins to monitor the pins (e.g., the I/O pin) or to provide malicious signals to payment reader 22 (e.g., by spoofing an EMV card). In some embodiments, a tamper switch may respond to signals that do not match expected signal characteristics (e.g., current, voltage, duty cycle, waveform, capacitance, etc.) and modify its electrical state (e.g., by opening a circuit, closing a circuit, modifying an electrical signal's amplitude or phase, etc.). Although such a tamper switch has been described in the context of the pins of an EMV payment slot 21 (FIG. 2), it will be understood that such a tamper switch may be implemented on any electrical signal lines or connections of payment reader 22.

In some embodiments, an attacker may attempt an attack that does not require physical access to the payment reader 22, for example, by sending radio frequency (RF) electromagnetic signals in order to create or modify a signal within payment reader 22, or to temporarily or permanently disable or modify the operation of one or more components of the payment reader 22. Exemplary anti-tamper devices 118 may comprise a tamper switch that may respond to sensed characteristics of RF signals that are abnormal or correspond to an attack, such as a signal strength, waveform, frequency, duty cycle, etc. In response to such sensed characteristics the tamper switch may modify its electrical state (e.g., by opening a circuit, closing a circuit, modifying an electrical signal's amplitude or phase, etc.).

Another exemplary anti-tamper device 118 may comprise a tamper mesh that may provide for a complete enclosure of the internal components of the payment reader 22 or critical components thereof. In some embodiments, a tamper mesh may include conductive traces in close proximity and creating a pattern that covers the protected components. It may be difficult to gain physical access to the components without damaging the conductive mesh due to the unique and dense pattern of the tamper mash. This results in a change in the electrical state of the tamper mesh (e.g., by opening a circuit, closing a circuit, modifying an electrical signal's amplitude or phase, etc.) that may be used to sense a tamper attempt and take corrective action.

In some embodiments, an anti-tamper device 118 may comprise an anti-tamper temperature circuit for measuring a temperature within payment reader 22, comparing the measured temperature against one or more threshold temperatures, and performing a response when a tamper attempt is detected. The anti-tamper temperature circuit may comprise temperature sensing components (e.g., polysilicon resistor circuitry) and any combination of hardware, software or otherwise for comparing the temperature within payment reader 22 with a threshold. In some embodiments, anti-tamper temperature circuit may be coupled to other anti-tamper devices 118 (e.g., tamper switch) for controlling operation of the anti-tamper devices 118 (e.g., shutting down the anti-tamper device 118) in response to a measured temperature or a comparison of a measured temperature with one or more pre-defined temperature thresholds.

In some embodiments, one or more additional power sources such as low-power batteries may be provided for low power operation, for example, when the majority of components of the payment reader 22 are powered down, or when a main battery of the power source 16 cannot power the payment reader 22. In an exemplary embodiment, such low power batteries may provide for critical functions such as safety or security functions to occur even when the payment reader 22 is not powered up. Although any suitable types of critical functions may be powered by such a low-power battery, in an exemplary embodiment a low-power battery may enable periodic monitoring of tamper attempts, e.g., to be able to monitor for tampering even when the payment reader 22 is not powered. As described herein, a low-power battery may supply an anti-tamper circuit 116, which may periodically monitor tamper devices 118.

Although a low-power battery may be implemented in any suitable manner, in an embodiment a low-power battery may be a battery such as a coin-cell battery. Although the low-power battery may be associated with any suitable component of payment reader 22 (e.g., power supply 106), in an embodiment the low-power battery may be implemented as a component of anti-tamper circuit 116. For example, when a low-power battery powers anti-tamper circuit 116, the anti-tamper circuit 116 may control and monitor the anti-tamper devices 118.

In some embodiments, the timing of the monitoring of the anti-tamper devices 118 may be based on a real-time clock of the anti-tamper circuit 116 powered by the low-power battery, such that the monitoring is based on the frequency of the real-time clock. Although in an exemplary embodiment, the monitoring may be performed periodically based on the frequency of the real-time clock, in some embodiments the timing of monitoring may be randomized (e.g., based on a random number generator) such that the timing of the monitoring is not predictable (e.g., by selectively providing power to the real time clock based on a randomized pattern). By only monitoring the tamper devices for a portion of the time it may be possible to achieve a small average current consumption by the anti-tamper circuit 116 and tamper devices 118.

In an embodiment, anti-tamper circuit 116 may provide notifications to other components of the payment reader 22 that a tamper attempt has been detected. Notifications may be stored (e.g., in a memory associated with the anti-tamper circuit 116) to be provided to other components of the payment reader 22 (e.g., processing unit 120) when they receive power, or in some embodiments, may be provided (e.g., as an interrupt) in a manner that causes one or more components to wake up. Once a tamper attempt is identified, the tamper attempt may be processed, e.g., by taking corrective action, providing notifications, deleting critical information (e.g., from cryptographic memory 128), disabling communication interfaces, any other suitable response, or any combination thereof. In some embodiments, some or all of this processing may be performed by the anti-tamper circuit 116.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a Texas Instruments CC2640 device, which may include a processing unit (not depicted) and memory (not depicted).

Wired communication interface 110 may include any suitable interface for wired communication with other devices or a communication network, such as USB, Lightning, FireWire, Ethernet, any other suitable wired communication interface, or any combination thereof. In some embodiments, wired communication interface 110 may allow payment reader to communicate with one or both of merchant device 29 and payment server 40.

In some embodiments, reader chip 100 may include a signal conditioning device 112 coupled to the contactless interface 102 to process signals provided to and received from the contactless interface 102. Although signal conditioning device 112 may include any suitable hardware, software, or any combination thereof, in an exemplary embodiment signal conditioning device may comprise an FPGA. Signal condition device 112 may condition sent and received signals to and from contactless interface 102, such as when a payment device 10 using NFC communication communicates with payment reader 22. In an embodiment, signal conditioning device 112 may operate based on instructions stored at reader chip 100 (e.g., signal conditioning instructions 136) for use in interacting with the contactless interface 102.

In some embodiments, reader chip 100 may include an anti-tamper circuit 116 for monitoring conditions of the reader 22 and detecting tamper attempts. Although anti-tamper circuit 116 may include any suitable components, in an embodiment, anti-tamper circuit 116 may include a real-time clock, local oscillator, pulse generator, and an interface various tamper detection devices, as described in further detail below. The anti-tamper circuit 116 may include hardware logic, software logic, or any suitable combination thereof (e.g., a processing unit in combination with memory and hardware logic) as described herein that performs the control, processing, communication, signal generation, and other functions necessary for the operation of the anti-tamper circuit 116.

In some embodiments, general memory 122 may be any suitable memory as described herein, and may include a plurality of sets of instructions for controlling operations of payment reader 22 and performing general transaction processing operations of payment reader 22, such as operating instructions 130, transaction processing instructions 132, data authentication instructions 134, signal conditioning instructions 136, and anti-tamper instructions 138.

Operating instructions 130 may include instructions for controlling general operations of the payment reader 22, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing memories stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with cryptographic processing unit 125 to perform most transaction processing operations. In addition, transaction processing instructions 132 may provide instructions for acquiring any suitable information from a chip card (e.g., via contact interface 104 and cryptographic processing unit 125) such as authorization responses, card user name, card expiration, etc.

Data authentication instructions 134 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK may be tailored for a particular jurisdiction (e.g., country-specific).

Signal conditioning instructions 136 may include instructions for conditioning signals received from a payment device 10 via the contactless interface 102 (e.g., from a NFC payment device 10). Although in some embodiments, signal conditioning instructions 136 may include instructions for manipulating signals received via contactless interface 102, signal conditioning instructions 136 may include instructions for conditioning signals, including signals that are initially processed by signal conditioning hardware, such as signal conditioning device 112.

Anti-tamper instructions 138 may include instructions for operating anti-tamper circuit 116 and anti-tamper devices 118, disabling resources of payment reader 22 when a tamper attempt is detected, and in the absence of a tamper attempt, may permit normal operations of the payment reader 22. In some embodiments, anti-tamper instructions 138 may include instructions for monitoring one or more pins of reader chip 100 (not specifically shown) coupled to one or more resources of anti-tamper circuit 116 to identify detection of a tamper attempt by the anti-tamper circuit 116. For example, anti-tamper instructions 138 may include instructions for monitoring a signal provided to a wake-up pin by an anti-tamper circuit 116, as well as signals that are indicative of a tamper attempt or type of tamper attempt.

Anti-tamper instructions 138 may include instructions for taking action when an output of anti-tamper circuit 116 indicates a tamper attempt. In some embodiments, anti-tamper instructions 138 may include instructions for providing a tamper notification, such as to merchant device 29, payment server 40 via network 30, or to a user of payment terminal 20. The tamper notification may comprise a suitable notification, such as a message transmitted via wired interface 108 or wired interface 110 of payment reader 22 or an audible, visible, or physical alarm signal. In an embodiment, a tamper notification may be provided via a resource of payment reader 22, and may provide a notification to a user of detection of a tamper attempt (e.g., output of light, sound, mechanical vibration, a combination thereof, or other output).

In some embodiments, anti-tamper instructions 138 may include instructions for controlling resources of payment reader 22, for example, in order to limit an intruder's access to information of the payment reader 22. For example, in some embodiments, anti-tamper instructions 138 may include instructions for disabling interfaces of payment reader 22, for example, to prevent further acquisition or transmission of potentially sensitive data. Anti-tamper instructions 138 may include instructions for general processing unit 120 to provide a signal to disable power supply 106. In this regard, general processing unit 120 may selectively disable a supply of power from power supply 106 to various resources of payment reader 22, such as any of the interfaces of payment reader 22 or reader chip 100.

In some embodiments, anti-tamper instructions 138 may selectively disable resources of payment reader 22 that an attacker may attempt to access in order to acquire potentially sensitive information while permitting other resources (e.g., anti-tamper circuit 116) to continue to operate. For example, anti-tamper instructions 138 may include instructions for removing, erasing, deleting or wiping one or more encryption keys stored in cryptographic memory 128 in order to prevent access to encrypted data when a tamper attempt is detected. Similarly, anti-tamper instructions 138 may include instructions for removing, erasing, deleting or wiping any suitable information from general memory 122 or cryptographic memory 128, such as user information (e.g., personally identifiable information, financial account information, or otherwise) in response to detection of a tamper attempt. In this regard, anti-tamper instructions 138 may include instructions for continuing to monitor an output of anti-tamper circuit 116 following detection of a tamper attempt and taking steps to further disable operation of payment reader 22 (e.g., completely power down payment reader 22) if one additional tamper attempt is detected within a pre-determined amount of time. Anti-tamper instructions 138 may include other instructions for performing other operations in other embodiments.

In some embodiments, anti-tamper instructions 138 may include instructions for collecting tamper attempts that may be identified locally at payment reader 22 or that may be transmitted to an external system (e.g., payment server 40) for storage, analysis, and complex processing of a tamper event (e.g., based on other known tamper events that are occurring in similar circumstances). In some embodiments, such an external analysis may result in a signal being received at general processing unit 120, which may shut off power to one or more components of reader chip 100 or payment reader 22 in response to that input.

Cryptographic processing unit 125 may be any suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176 and cryptographic instructions 178. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

Figure 4:
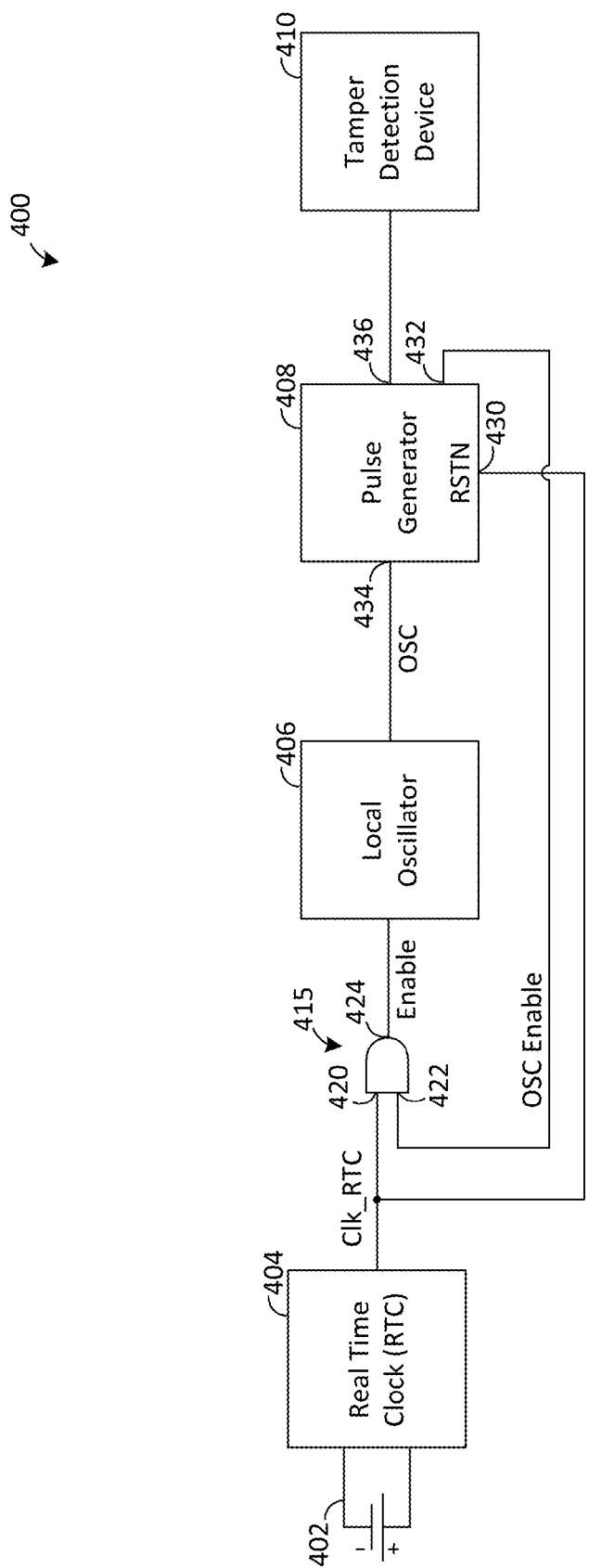
FIG. 4 depicts an exemplary anti-tamper circuit monitoring system in accordance with some embodiments of the present disclosure.

FIG. 4 depicts an exemplary anti-tamper monitoring system 400 in accordance with some embodiments of the present disclosure. In the embodiment of FIG. 4, the components of anti-tamper monitoring system 400 are depicted as being configured in a particular order, but the components of anti-tamper monitoring system 400 may be configured in other suitable configurations and with other or different circuitry. Although an anti-tamper monitoring system 400 may include a variety of components in accordance with the present disclosure, in some embodiments, anti-tamper monitoring system 400 may include a battery 402, clock source 404, oscillator 406, pulse generator 408, one or more tamper detection devices 410 and an enabling circuit 415. While, in an embodiment, anti-tamper monitoring system 400 includes a battery 402, clock source 404, oscillator 406, pulse generator 408, and an enabling circuit 415 configured for periodic monitoring of one or more tamper detection devices 410, anti-tamper monitoring system 400 may include different components and arrangements thereof in order to perform monitoring (e.g., periodic and/or randomized monitoring) of the one or more tamper detection devices 410.

In an embodiment, battery 402 may comprise a battery capable of powering the various components of monitoring system 400. In some embodiments, battery 402 may be a battery of power supply 106 or may be a separate power supply located elsewhere within payment reader 22 (e.g., on reader chip 100). Battery 402 may be a low power consumption battery such as a coin-cell battery and may be coupled to clock source 404 and other components of the monitoring system 400 (e.g., tamper detection device 410, etc.). In some embodiments, battery 402 may comprise a plurality of batteries and may be rechargeable or interchangeable (e.g., when an external power supply is provided to the payment reader 22).

In an embodiment, clock source 404 may be coupled to battery 402, and may be a suitable clock such as a real time clock (RTC), a crystal oscillator, or other clock, and may output a periodic clock signal having a clock source frequency and a clock source duty cycle when power is received from the battery 402. In some embodiments, clock source 404 may output a periodic signal at the clock source frequency to various components of monitoring system 400, such as enabling circuit 415 and pulse generator 408. The high portion of the signal from the clock source 404 may provide power to the other components of the monitoring system 400, such that those components are not powered during low portions of the clock source 404 signal. In some embodiments, a clock source frequency of the periodic signal of clock source 404 may be an order of magnitude or more less than a frequency of an oscillating signal from oscillator 406, as described below.

In an embodiment, enabling circuit 415 may comprise suitable components or hardware (e.g., logic gates, transistors, etc.) for selecting appropriate times to provide an enabling signal to the local oscillator 406 or other circuitry of the monitoring system 400 based on one or more controlling inputs to the enabling circuit 415 (e.g., as depicted in FIG. 4, from the real-time clock 404 and the pulse generator 408. In some embodiments, enabling circuit 415 may perform the functionality of an AND logic gate for receiving a plurality of signals and providing an output that is high when the input signals are high and low when any of the input signals is low. In some embodiments, enabling circuit 415 may include a clock source input 420, oscillator enable input 422, and oscillator activation output 424. Clock source input 420 may be coupled to clock source 404, and may receive a signal from clock source 404, such as the periodic signal. In some embodiments, oscillator enable input 422 may receive an enabling signal, such as from pulse generator 408 as described further below. Oscillator activation output 424 may provide an oscillator activation signal, such as to oscillator 406 as described further below. In some embodiments, enabling circuit 415 may be configured to output the oscillator activation signal via oscillator activation output 424 when both the enabling signal received from pulse generator 408 and periodic signal received from clock source 404 are approximately greater than or exceed a threshold voltage (e.g., 3V or other value). Although not depicted in FIG. 4, enabling circuit 415 may output the oscillator activation signal in response to other signals (e.g., from a hardware switch or other circuitry of payment reader 22).

Oscillator 406 may be coupled to the enabling circuit 415 and may be a suitable electronic oscillator for producing an oscillating signal. In an embodiment, oscillator 406 may produce an oscillating signal in response to an enabling input signals, such as when the oscillator activation signal is received from enabling circuit 415. In some embodiments, a frequency of the oscillating signal may be at least an order of magnitude greater than the clock source frequency, although other frequencies are possible in other embodiments. In some embodiments, different or additional enabling inputs or other stimuli (e.g., from a hardware switch or other circuitry of the payment reader 22).

Pulse generator 408 may be coupled to the one or more tamper detection devices 410, the output of the clock source 404, as an input to the enabling circuit 415, and to the output of the oscillator 406. In an embodiment, pulse generator may be an electronic pulse generator for generating and receiving a variety of pulses having different patterns and pulse widths, in a manner to facilitate the operation and control of the other components of the monitoring system 400. In an embodiment as depicted in FIG. 4, the pulse generator 408 may generate, receive, and analyze signals based on a source signal provided by the oscillator 406, which may provide a base frequency for generating certain signals of the pulse generator (e.g., the control and communication signals provided for the operation of the tamper detection devices 410).

In some embodiments, a signal generated and output by pulse generator 408 may comprise pulses or other suitable waveforms to control and communicate with the tamper detection devices 410 and/or other components of the monitoring system or payment reader (e.g., to provide a signal to general processing unit 120). In an embodiment, pulse generator 408 may provide an enabling signal to enabling circuit 415 when a high signal is received from the clock source 404, e.g., for a portion of the time that the clock source provides the high signal. Although the pulse generator 408 may provide the enabling signal for a portion of the high portion of the clock source 404 output in a variety of manners, in an embodiment the enable signal may initially be provided based on the high signal being received from the clock source 404, and then turned off after a threshold number of clock cycles from the oscillator 406.

In some embodiments, pulse generator 408 may generate and provide the one or more control signals to the one or more tamper detection devices 410 to perform tamper detection operations. For example, control signals output by pulse generator 408 may include signals for providing power to tamper detection devices 410 such as temperature or voltage monitors of the one or more tamper detection devices 410, receiving and/or sampling data from the one or more tamper detection devices 410, providing control signals to modify or control the operation of the one or more tamper detection devices 410, and otherwise interacting with the tamper detection devices 408. In some embodiments, pulse generator 408 may generate and provide other signals for other purposes, such as communicating with other components of payment reader 22.

In some embodiments, pulse generator 408 may comprise a clock source input 430, enabling output 432, oscillator input 434, and tamper control output 436. In an embodiment, clock source input 430 may be coupled to clock source 404 and may receive a periodic signal, such as the periodic signal from clock source 404. Enabling output 432 may provide an enabling signal, such as to enabling circuit 415 when pulse generator receives the periodic signal from clock source 404. Oscillator input 434 may receive the oscillating signal, such as from oscillator 406 when it receives the oscillator activation signal. Tamper control output 436 may be coupled to the one or more tamper detection devices 410 and may provide the one or more control signals to the one or more tamper detection devices 410 and otherwise communicate with tamper detection devices 410.

The one or more tamper detection devices 410 may comprise any suitable devices for detecting tamper attempts at payment reader 22. In some embodiments, the one or more tamper detection devices 410 may comprise one or more tamper switches, dome switches, temperature monitor devices, tamper meshes, or other suitable switches or components for monitoring activities related to possible tamper attempts. In an exemplary embodiment, the one or more tamper detection devices 410 comprises a temperature monitoring circuit, and may comprise various sensing circuitry as discussed further below. As described in further detail hereafter, the temperature monitoring circuit may have various components, including a temperature sensing circuit, temperature threshold circuit, voltage divider circuit, and temperature comparison circuit for detecting tamper attempts.

Figure 5:
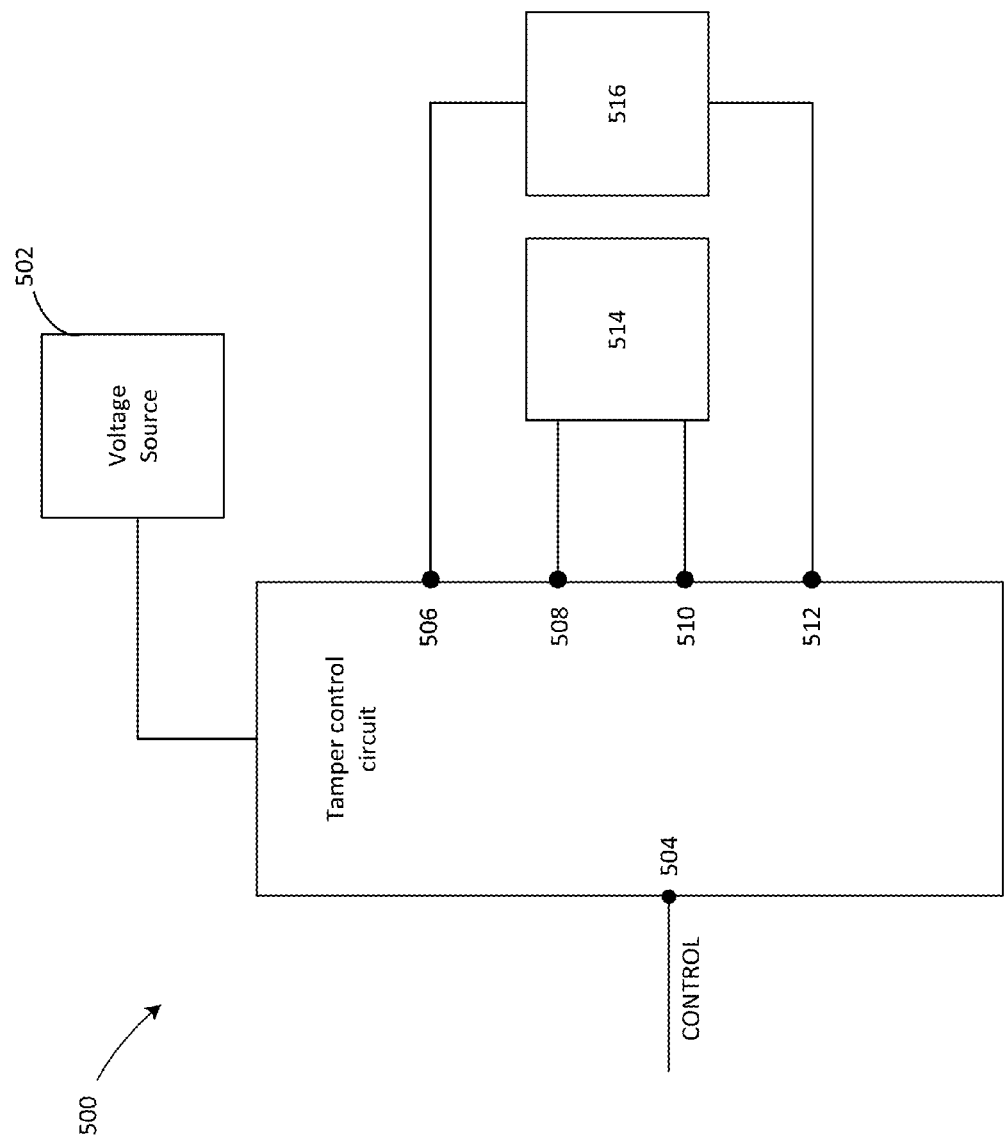
FIG. 5 depicts an exemplary tamper detection circuit in accordance with some embodiments of the present disclosure.

FIG. 5 depicts exemplary tamper detection devices 410 in accordance with some embodiments of the present disclosure. In some embodiments, the tamper control circuit 500 may be coupled to a voltage source 502 for providing a voltage to tamper detection circuit 410 devices based on an input to tamper control circuit 500, and may include control input pin 504 (e.g., for communicating with pulse generator 408) and a plurality of tamper signal pins (e.g., tamper signal pins 506, 508, 510, and 512 for providing signals to tamper detection devices).

Although the tamper detection circuit 410 of FIG. 5 may include any suitable components in accordance with the present disclosure, in some embodiments, tamper detection circuit 410 may include tamper control circuit 500 and tamper detection devices 514 and 516. Each of tamper detection devices 514 and 516 may be any suitable tamper detection device such as temperature monitoring devices, voltage monitoring devices, tamper switches, tamper meshes, or any combination thereof. Although two tamper detection devices 514 and 516 are depicted in FIG. 5, it will be understood that any suitable number of tamper detection devices, and any suitable combination of tamper detection device types, may be implemented within a tamper detection circuit 410 in accordance with the present disclosure. Tamper detection devices 514 and 516 may include any suitable hardware, and in some embodiments embedded logic such as hardware logic, for monitoring for different types of tamper attempts.

In some embodiments, tamper control circuit 500 of tamper detection circuit 410 may receive control signals via control pin 504 from a suitable control device such as pulse generator 408. These signals may control the operation of components of tamper detection circuit 410 such as the voltage source 502 and the tamper detection devices 514 and 516. In an embodiment, certain sequences of pulses provided to the tamper control circuit may cause the voltage source 502 to provide voltages that may be provide the necessary voltage and power to operate the tamper detection devices.

Signals received by the tamper control circuit 500 may also control the timing, settings, operation, and other functionality of the tamper detection devices 514 and 516. In an embodiment, the received control signal may determine factors such as sequences of pulses that are output to one or more of the tamper signal pins 506, 508, 510, or 512. Based on the type of tamper detection device employed (e.g., a temperature monitor device or voltage monitor device), a tamper event may be determined based on the type of signal received at associated tamper signal pins (e.g., tamper signal pin 512 for tamper signal pin 506, or tamper signal pin 510 for tamper signal pin 508). In an embodiment of a normally closed tamper detection device, and in the absence of a tamper event, a signal should be received at the tamper signal pins 510 and 512. In an embodiment of a normally open tamper detection device, and in the absence of a tamper event, a signal should not be received at the tamper detection pins 510 and 512 if signals are provided from tamper signal pins 506 and 508.

In some embodiments, tamper control circuit 500 may receive one or more control signals at control pin 504 when power is provided to the tamper control circuit 500 (e.g., when power is periodically supplied based on the operation of the clock source 404). The one or more control signals may be of any suitable characteristic for controlling operation of any anti-tamper devices (e.g., tamper detection devices 514 and 516). In an embodiment of a temperature tamper detection device, control signals may cause signals to be provided to the temperature tamper detection device such that the device will operate, and such that an output (e.g., received via a tamper signal pin) may indicate whether a threshold is exceeded or not met.

In an embodiment, control signals received at control input pin 504 may include signals such as a voltage source enable, monitor enable, monitor sample, or voltage source start-up assist signal. For example, tamper control circuit 500 may provide power to assist start-up of voltage source reference 502 when a voltage source start-up assist control signal is received at control pin 504. In an embodiment, tamper control circuit 500 may enable voltage source 502 when a voltage source enable control signal is received at control pin 504. In an embodiment, when a monitor enable control signal is received at control pin 504, anti-tamper circuit may provide an enabling signal to one or more of the tamper detection devices 514 and 516 for monitoring tamper attempts (e.g., via the tamper signal pins). At a desired time, a monitor sample signal may be received at control pin 504, and anti-tamper circuitry may provide a signal to tamper detection circuitry 500 to return results of monitoring of the tamper detection devices 514 and 516 (e.g., via the tamper signal pins). In other embodiments, other control signals may be received at control pin 504, and suitable operations of tamper control circuit 500 and tamper detection devices 514 and 516 may be based on a control signal received at control pin 504.

Figure 6:
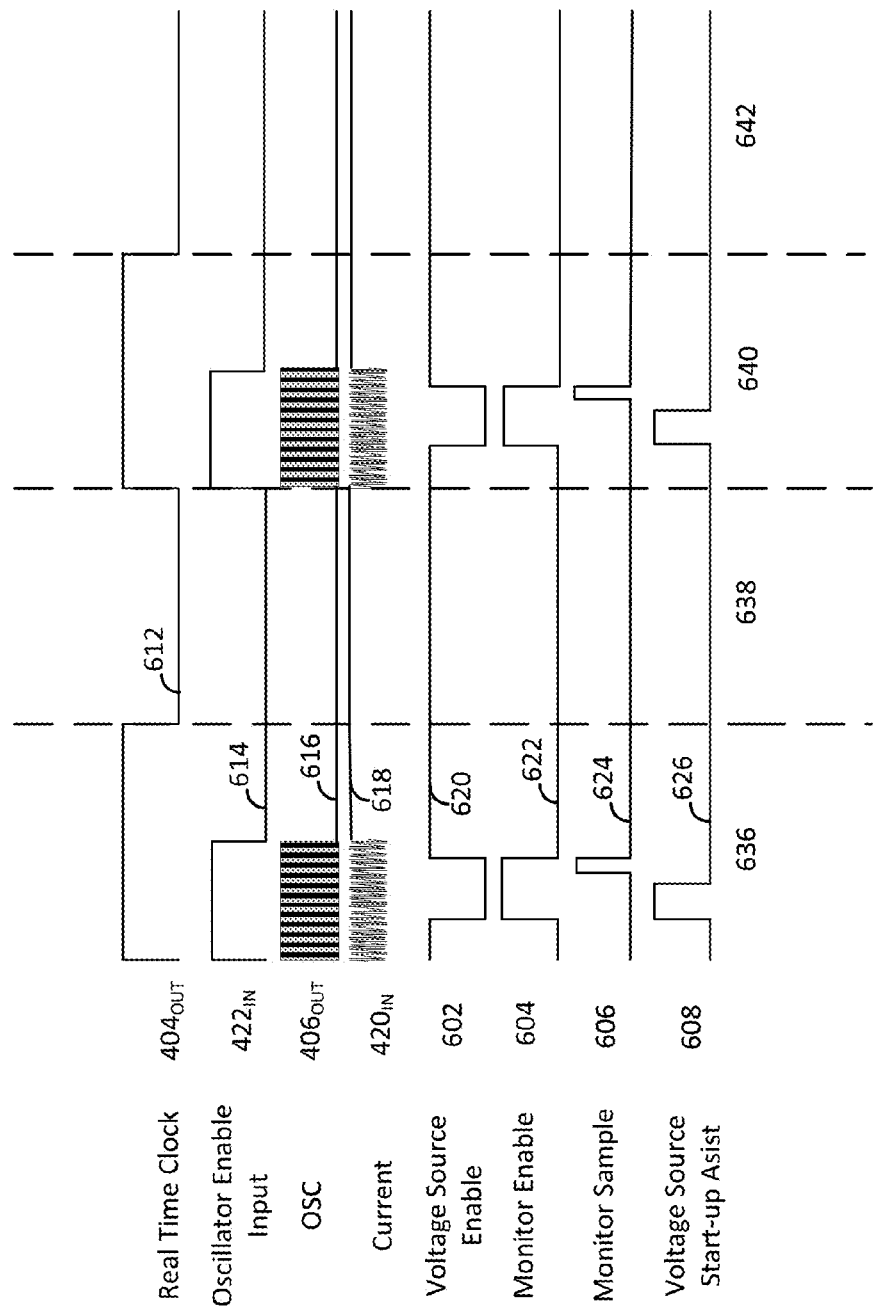
FIG. 6 depicts an exemplary signal diagram of an anti-tamper circuit monitoring system in accordance with some embodiments of the present disclosure.

FIG. 6 depicts an exemplary signal diagram of the anti-tamper monitoring system 400 of FIG. 4 in accordance with some embodiments of the present disclosure. FIG. 6 depicts various outputs or inputs from components of the anti-tampering monitoring system, such as the output from clock source 404, oscillator enable input 422 to enabling circuit 415 (e.g., oscillator enable output 432 from pulse generator 408), the output oscillating signal from oscillator 406 (e.g., the oscillator input signal 434 to pulse generator 408), clock source input 420 of enabling circuit 415, and one or more control signals of tamper control output 436, including voltage source enable signal 602, monitor enable signal 604, monitor sample signal 606, and voltage source start-up assist 608. For ease of depiction and understanding, all of the pulses are depicted as square waves and propagation delays are not depicted in FIG. 6.

FIG. 6 depicts pulse 612 being output from clock source 404, pulse 614 being received at oscillator enable input 422, pulse 616 being output from oscillator 406, pulse 618 being received at clock source input 420, and pulses 620, 622, 624, and 626 being output from tamper control output 436. In FIG. 6, the various pulses are being output and received during four time periods 636, 638, 640 and 642, each of which corresponds to a high or low period of the periodic clock signal output from the clock source 404. As described herein, in an embodiment, the other signals are output and received only during the times when clock source 404 exceeds a threshold voltage (e.g., provides a high signal, such as at time periods 636 and 640), based on power being provided to those components via this periodic output.

During time sequences 636 and 640, clock source 404 outputs pulse 612 (e.g., the periodic signal) which is initially high. Current (depicted as a sawtooth function in FIG. 6 but comprising varying spikes and other details not specifically shown for simplicity's sake) begins to be consumed as demonstrated by pulse 618 which is received at clock source input 420. When clock source 404 goes high, oscillator enable input 422 receives the enabling signal of the pulse 614, such as from enabling signal output 432 of pulse generator 408. Note that both the signals received at clock source input 420 and oscillator enable input 422 (e.g., the enabling signal and periodic signal) may exceed a threshold voltage of the enabling circuit 415, and, in response, enabling circuit 415 may provide an oscillator activation signal to oscillator 406. Oscillator 406 may produce an oscillating signal in response to such a signal, indicated by the higher frequency square wave of pulse 616. Note that each of signals 614, 616 and 618 may be operational for similar durations (while the one or more tamper detection devices 514 or 516 detects tamper attempts) until signal 614 goes low (e.g., as a result of self-shutoff of oscillator 406). After signal 614 returns to a low power state, each of the signals 616, 618, 620, 622, 624 also may return to a non-operational state. During time sequence 640, a similar cycle may repeat for each of signals 612, 614, 616, 618, 620, 622, 624, and 626.

In some embodiments, during the portions of time sequences 636 and 640 during which the oscillator 406 is operation, a plurality control signals may be provided from the pulse generator 408, such as voltage source enable signal 602, monitor enable signal 604, monitor sample signal 606, and voltage source start-up assist signal 608. As noted above, oscillator 406 may become active when it receives an oscillator activation signal from enabling circuit 415. The oscillator output may provide a base frequency that allows the pulse generator 408 to generate timed pulses for the signals that are provided to the tamper detection device 410, as described herein.

In the embodiment of FIG. 6, signal 620 depicts voltage source enable control signal 602 that may enable a voltage source such as voltage source 502. Voltage from the voltage source may provide power the one or more tamper detection devices 514 and 516. In some embodiments, the control signal for voltage source enable signal 602 may be asserted low, although other signaling may be provided in other embodiments. Voltage source enable signal 602 may cause a voltage source (e.g., voltage source 502) to provide a voltage to one or more tamper detection devices (e.g., the one or more tamper detection devices 514 and 516 of FIG. 5) for performing periodic tamper detection and monitoring (e.g., providing power to a voltage monitor device for monitoring voltage or to a temperature monitor device for monitoring temperature).

Signal 622 shows an exemplary monitor enable control signal 604 that may cause tamper control circuit 500 to provide signals to tamper detection devices in order to monitor the tamper detection devices. The tamper control circuit 500 may provide the signals to the tamper detection devices and monitor for results indicating tamper attempts while receiving the monitor enable control signal 604. Signal 624 depicts an exemplary monitoring sample signal 606 for sampling results from tamper control circuit 500 and/or the tamper detection devices 514 or 516. Control signal 606 may cause tamper control circuit 500 to collect sample data from the one or more tamper detection devices 514 and 516. Tamper control circuit 500 may identify a tamper attempt based on the sample data. Signal 626 indicates that voltage source startup assist control signal 608 may be asserted to assist in providing enabling voltages to the tamper detection devices.

Figure 7:
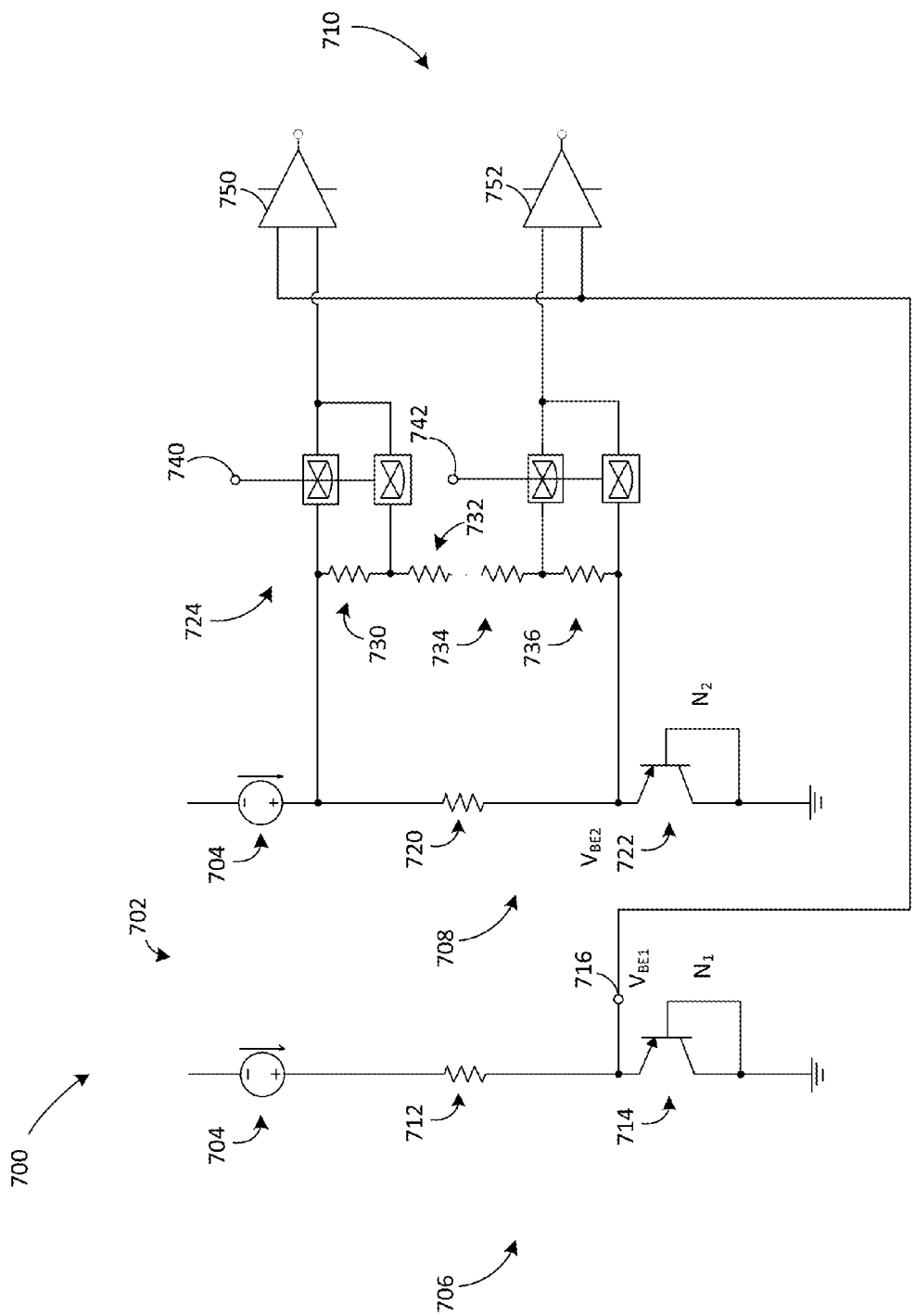
FIG. 7 depicts an exemplary temperature alarm circuit in accordance with some embodiments of the present disclosure.

FIG. 7 depicts an exemplary temperature alarm circuit 700 in accordance with some embodiments of the present disclosure. Although temperature alarm circuit 700 may be implemented in any suitable manner and using a variety of components, in some embodiments, temperature alarm circuit 700 may comprise a current source 704, temperature sensing circuit 706, temperature threshold circuit 708 and temperature comparison circuit 710. Current driven by current source 704 (e.g., a sensing current) may create a voltage difference ("$\Delta V_{BE}$" of FIG. 7) between diodes of the temperature sensing circuit 706 and temperature threshold circuit 70 according to the following $$\Delta V_{BE} = \frac{kT \times \ln(N)}{q} \qquad \text{"Equation 1"}$$

where T is a corresponding temperature (e.g., of temperature sensing circuit 706), K is Boltzmann's constant, q is a fundamental electronic charge and N (e.g., $N_2/N_1$) is a ratio of sizes between respective diodes. Using Equation 1, a temperature of temperature sensing circuit 706 may be determined for a given voltage difference $\Delta V_{BE}$ when values associated with various components of temperature alarm circuit 700 as discussed below (e.g., diode sizes) are known. Temperature alarm circuit 700 may identify a tamper attempt by comparing the temperature with one or more threshold temperature values.

In some embodiments, to perform tamper detection, temperature comparison circuit 710 may compare a voltage measured from the temperature sensing circuit 706 with one or more voltages measured from the temperature threshold circuit 708 (e.g., an aggregate voltage measured from various points or nodes of a voltage divider circuit selected to yield a threshold voltage, as described below) to determine whether a pre-determined threshold has been exceeded. As described further below, temperature comparison circuit 710 may provide an output, such as to anti-tamper circuit 116, indicating a result of the comparison (e.g., whether the voltage measured from the temperature sensing circuit 706 falls outside of respective high and low voltage thresholds), and thus, whether a tamper attempt has been detected. Anti-tamper circuit 116 may provide a signal to general processing unit 120, and general processing unit 120 may take action based on the output (e.g., by executing anti-tamper instructions 138).

In an embodiment, current source 704 may provide a sensing current to the components of temperature alarm circuit 700. In an embodiment, the sensing current provided by current source 704 may be converted from AC power or may be DC current, such as from a battery (e.g., a battery driving anti-tamper circuit 116 or otherwise). In some embodiments, current source 704 may be a component of power supply 106 of payment reader 22, but current source 704 may be another component in other embodiments. In an exemplary embodiment, current source 704 may be provided by a band-gap voltage supply that maintains a fixed relationship with respect to temperature when paired with components such as an appropriate polysilicon resistor.

In some embodiments, current source 704 may provide a sensing current to both temperature sensing circuit 706 and temperature threshold circuit 708. In an embodiment, a magnitude of the sensing current provided to both temperature sensing circuit 706 and temperature threshold circuit 708 may be approximately equal (e.g., provided by a voltage reference), but the sensing current may have other magnitudes in other embodiments. Note that, in some embodiments, a magnitude of the sensing current may be proportional to a resistance of various components of temperature alarm circuit 700. In an embodiment, a magnitude of sensing current may be inversely proportional to a resistance of one or more resistors, as described further below (e.g., resistors of temperature sensing circuit 706 and temperature threshold circuit 708). In other embodiments, sensing current provided by current source 704 may have other values and be based on other characteristics of the temperature alarm circuit 700, anti-tamper circuit 116, payment reader 22, or otherwise.

In the embodiment of FIG. 7, temperature sensing circuit 706 comprises a first polysilicon resistor 712, first diode 714 (e.g., a body diode of a transistor, as depicted in FIG. 7), and measurement node 716. The first polysilicon resistor 712 may be coupled to the current source 704, and may be an on-chip polysilicon resistor having a sheet-resistance. In some embodiments, the first polysilicon resistor 712 may comprise any suitable component for providing required resistance of the temperature sensing circuit 706 and achieving functionality of temperature sensing circuit 706 as described herein. Note that a current (e.g., sensing current) driven through the first polysilicon resistor 712 may be inversely proportional to a resistance of the first polysilicon resistor 712. In this regard, a voltage produced via first polysilicon resistor 712 may remain fixed independently of process or temperature.

In some embodiments, measurement node 716 may include suitable hardware for permitting measurement of a voltage ($V_{BE1}$ of Equation 1) of the diode 714 of the temperature sensing circuit 706 (e.g., via coupling to one or more components of temperature comparison circuit 710). In some embodiments, measurement node 716 may be located between the first polysilicon resistor 712 and first diode 714 to permit measurement of a voltage at the measurement node 716 before a voltage drop across first diode 714 (e.g., which may change with temperature as described herein), which may be measured (e.g., compared to threshold) such as by the temperature comparison circuit 710. Measurement node 716 may comprise other hardware and couple to other suitable components of temperature alarm circuit 700 in other embodiments.

Although first diode 714 may comprise any suitable diode, in an embodiment the first diode 714 may be implemented as a body diode of a transistor. In an embodiment, first diode 714 may be coupled to the first polysilicon resistor 712 to receive the sensing current, and may have diode characteristics (e.g., a size $N_1$ of Equation 1, a diode voltage drop, doping type, etc.). First diode 714 may comprise a body diode of a bipolar junction transistor (BJT) or other similar device, and it will be understood that "diode," as used herein, may refer to any suitable component that provides a voltage drop having appropriate temperaturedependent characteristics with proportional components (e.g., body diode 722) as described herein.

In some embodiments, temperature threshold circuit 708 may comprise a second polysilicon resistor 720, second diode 722, voltage divider circuit 724, and a plurality of threshold nodes 730, 732, 734, and 736. Although FIG. 7 depicts various specific components of temperature threshold circuit 708 arranged in a particular fashion, it will be understood that temperature threshold circuit 708 may comprise other suitable components for achieving the functionality described herein.

Second polysilicon resistor 720 may be coupled to current source 704 and voltage divider circuit 724, may comprise any suitable polysilicon resistor 720, and may have characteristics and functionality similar to the characteristics and functionality described above with regard to first polysilicon resistor 712 (e.g., magnitude of the sensing current from current source 704 is inversely proportional to a resistance of the second polysilicon resistor 720). In some embodiments, a difference between a resistance of the first polysilicon resistor 712 and second polysilicon resistor 720 may be less than a replica threshold. A replica threshold may refer to a maximum difference in between a resistance of the first polysilicon resistor 712 and resistance of second polysilicon resistor 720 such that a very similar voltage drop may be achieved over both polysilicon resistors.

In an embodiment, second diode 722 may be coupled to second polysilicon resistor 712 to receive the sensing current, may comprise any suitable diode, and may have characteristics and functionality similar to the characteristics and functionality described above with regard to first diode 714. For example, second diode 722 may have a size $N_2$ of Equation 1 that is different than the size $N_1$ of diode 714, diode voltage drop $V_{BE2}$ of Equation 1, doping type, and may have functionality for managing a direction of flow of the sensing current and other characteristics. Note, in some embodiments, that a difference between a size of second diode 722 and first diode 714 may be greater than a sensing threshold. In this regard, a ratio of a size of first diode 714 ($N_1$) and size of second diode 722 ($N_2$) described by Equation 1 may be sufficiently large to permit sensing of a voltage drop across each of first diode 714 and second diode 722 by the temperature alarm circuit 700 (e.g., via temperature comparison circuit 710). In this regard, a difference in voltages across temperature sensing circuit 706 and temperature threshold circuit 708 ($\Delta V_{BE}$ of Equation 1) may be determined by a comparison of sizes the respective second diode 722 and first diode 714, and as described herein, may be used to establish thresholds for the comparison of $V_{BE1}$ to thresholds.

In some embodiments, a voltage divider circuit 724 may be coupled in parallel with second polysilicon resistor 720, and may comprise any suitable components for associating a voltage of a plurality of voltage threshold nodes 730, 732, 734, and 736 with a plurality of temperature thresholds. Each of the plurality of voltage threshold nodes 730, 732, 734, and 736 may comprise any suitable component for associating the respective threshold node with one of a plurality of temperature thresholds. In some embodiments, each of threshold nodes 730, 732, 734, and 736 comprises a resistor of suitable resistance, may be coupled to one of selection circuits 740 or 742, and may be arranged in series (e.g., as a "resistor ladder") within voltage divider circuit 724. Thus, each of threshold nodes 730, 732, 734, and 736 may divide a voltage across the voltage divider circuit 724 according to one or more pre-determined voltage step sizes. In some embodiments, each of the one or more pre-determined voltage step sizes may correspond to a pre-determined temperature step (e.g., a step size of 0.67 mV may correspond to a temperature step of approximately 2.5° C. or other corresponding step size). Voltage divider circuit 724 may comprise a suitable number of threshold nodes 730, 732, 734 and 736 to adequately sense (and detect tamper attempts) ranges of temperatures detectable by the temperature alarm circuit 700. Note that only four threshold nodes 730, 732, 734, and 736 are shown in FIG. 7 for simplicity, but that, in some embodiments, any number of threshold nodes is possible to achieve a desired resolution and range of voltages and temperatures of the temperature threshold circuit 708.

Depending on conditions in which payment reader 22 may be used, a temperature range within which payment reader 22 may operate normally (and within which no tamper alarm may be triggered) may vary. It thus may be desirable to adjust or vary a range of temperatures for which operation of the payment reader 22 may be considered "normal" (tamper-free). The temperature range may be defined by a high temperature likely to be exceeded during a tamper attempt (a high temperature threshold) and a low temperature likely to exceed a temperature within the payment reader 22 during a tamper attempt (a low temperature threshold). In addition, calibration of the voltage divider circuit 724 may be performed to identify an offset correlation between a voltage associated with a given threshold node 730, 732, 734, or 736 and a temperature of payment reader 22 as indicated by a voltage at the measurement node 716.

In some embodiments, a threshold node 730, 732, 734, or 736 corresponding to a voltage of a desired high temperature threshold may be selected using selection circuit 740, and a threshold node 730, 732, 734, or 736 corresponding to a voltage of a desired low temperature threshold may be selected using selection circuit 742. In an embodiment, each of selection circuits 740 and 742 may be coupled to a suitable number of threshold nodes 730, 732, 734, and 736 for selecting a threshold from a plurality of threshold nodes 730, 732, 734, and 736 of voltage divider circuit 724 having a voltage corresponding to a temperature associated with a respective high temperature threshold (e.g., as controlled via selection of the corresponding threshold node by selection circuit 740) or low temperature threshold (e.g., as controlled via selection of the corresponding threshold node by selection circuit 742). In this regard, an acceptable range of detectable temperatures may be defined (e.g., based on a comparison of the voltage from the measurement node 716 with voltage of one or more pre-selected threshold nodes 730, 732, 734, or 736) using selection circuits 740 and 742. Note that each of selection circuits 740 and 742 may comprise any suitable components for enabling transmission of a voltage (e.g., creating a short circuit) from any of threshold nodes 730, 732, 734, or 736 to temperature comparison circuit 710, while bypassing voltages (e.g., creating an open circuit) from one or more of the remaining threshold nodes 730, 732, 734, or 736.

Temperature comparison circuit 710 may be coupled to measurement node 716 and temperature threshold circuit 724 and may comprise any suitable hardware for performing a comparison of the measured temperature with the plurality of temperature threshold voltages of the plurality of threshold nodes 730, 732, 734, and 736. In some embodiments, temperature comparison circuit 710 may comprise one or more comparators for performing the comparison. In an embodiment, temperature circuit 710 may comprise comparators 750 and 752, but other suitable numbers and arrangements of comparators may be possible in other embodiments.

As shown by FIG. 7, in some embodiments, temperature comparison circuit 710 may compare a voltage of the measurement node 716 (e.g., $V_{BE1}$) associated with a measured temperature within the payment reader 22 to a plurality of temperature threshold voltages using comparators 750 and 752. In some embodiments, comparators 750 and 752 may comprise a plurality of input pins for receiving inputs, such as from measurement node 716 and the plurality of threshold nodes 730, 732, 734, and 736. In an embodiment, comparator 750 may compare a voltage from measurement node 716 received at a high input pin of comparator 750 with a high temperature threshold voltage (e.g., of a corresponding high temperature voltage threshold node) of the plurality of temperature threshold voltages at a low input pin. Based on the comparison, comparator 750 may identify whether the voltage of measurement node 716 exceeds a high-temperature threshold. In this regard, comparator 750 may output a zero (e.g., low voltage) if no error is detected (e.g., when a voltage of measurement node 716 does not exceed a high temperature threshold voltage). Conversely, comparator 750 may output a one (e.g., high voltage) if an error is detected (e.g., when a voltage of measurement node 716 does exceed a high temperature threshold voltage). In this regard, comparator 750 may provide a signal indicative of whether a tamper attempt has been detected based on a temperature within payment reader 22 exceeds a high temperature threshold.

In some embodiments, comparator 752 may be configured to compare inputs received at its plurality of input pins. For example, comparator 752 may compare a voltage from measurement node 716 received at a low input pin of comparator 752 with a low temperature threshold voltage (e.g., of a corresponding low temperature voltage threshold node) of the plurality of temperature threshold voltages received at the high input pin. Based on the comparison, comparator 752 may identify whether the voltage of measurement node 716 falls below a low-temperature threshold. In this regard, comparator 752 may output a zero (e.g., low voltage) if no error is detected (e.g., when a voltage of measurement node 716 exceeds a low temperature threshold voltage). Conversely, comparator 752 may output a one (e.g., high voltage) if an error is detected (e.g., when a voltage of measurement node 716 falls below a low temperature threshold voltage). In this regard, comparator 752 may provide a signal indicative of whether a tamper attempt has been detected based on a temperature within payment reader 22 falls below a low temperature threshold.

Turning now to further examples of tamper detection via operation of voltage divider circuit 724 and temperature comparison circuit 710 according to some embodiments of the present disclosure, it will be understood that such examples are discussed for further illustration only, and are not intended to limit the foregoing in any way. A range of temperatures may be identified that are within a normal operating temperature range of payment reader 22 and that reflect an increased likelihood that a tamper attempt is occurring when payment reader 22 experiences a temperature outside the range. The highest and lowest temperatures of the range may thus constitute threshold temperatures that, when the payment reader 22 experiences a temperature beyond one of the thresholds, is likely to indicate a tamper attempt.

High and low temperature thresholds may correspond to voltages of threshold nodes 730, 732, 734, and 736 of voltage divider circuit 724. Voltage step sizes of threshold node 730, 732, 734, and 736 may correspond to temperature increments sensed by the temperature alarm circuit 700. A desired plurality of temperature thresholds (e.g., high and low temperature thresholds) corresponding to a plurality of temperature threshold nodes 730, 732, 734, and 736 may be selected using selection circuits 740 and 742, respectively. When one or more threshold node 730, 732, 734, or 736 are selected, one or more corresponding voltages may be provided to temperature comparison circuit 710. From time to time (continuously or otherwise when a sensing current is provided to temperature sensing circuit 706 and temperature threshold circuit 708), temperature comparison circuit 710 may compare a magnitude of the one or more corresponding voltages from threshold nodes of the voltage divider circuit 724 with a voltage sensed at measurement node 716 (induced by the sensing current). If the voltage of the measurement node 716 exceeds a voltage associated with a high temperature threshold (based on voltages of selected high threshold nodes 730, 732, 734, and 736), temperature comparison circuit 710 may provide an output indicating a tamper attempt has been detected (e.g., either high or low output signal, or otherwise). If the voltage of the measurement node does not exceed a voltage associated with a low temperature threshold, (based on voltages of selected low threshold nodes 730, 732, 734, and 736), temperature comparison circuit 710 may provide an output indicating a tamper attempt has been detected. Otherwise, temperature comparison circuit 710 may provide an output indicating that no tamper attempt has been detected.

Figure 8:
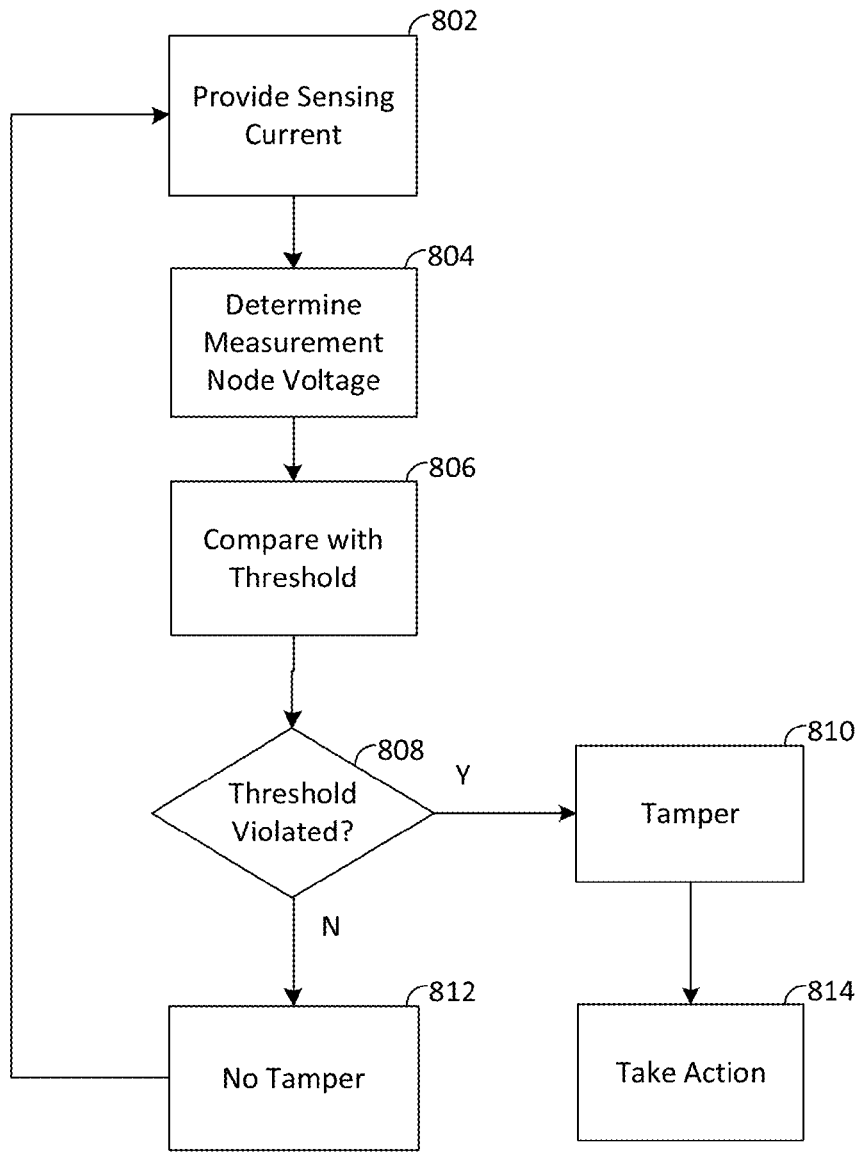
FIG. 8 depicts a non-limiting flow diagram illustrating exemplary methods for operating a temperature alarm circuit in accordance with some embodiments of the present disclosure.

FIG. 8 depicts steps 800 of a non-limiting flow diagram illustrating exemplary methods for operating a temperature alarm circuit as depicted in FIG. 7 in accordance with some embodiments of the present disclosure. In an embodiment, the steps of FIG. 8 may be directed to and performed by a temperature alarm circuit for detecting tamper attempts based on comparison of a temperature sensed by a temperature sensing circuit with one or more threshold temperatures of a temperature threshold circuit. However, it will be understood that in some embodiments (not depicted in FIG. 8), a tamper attempt may be sensed in other manners, as described herein. For example, other tamper detection devices, such as a voltage monitor, tamper switch, or tamper mesh may be incorporated for detecting a tamper event.

At step 802 current source 704 may provide a sensing current to each of temperature sensing circuit 706 and temperature threshold circuit 708. As described herein, the sensing current 704 may be inversely proportional to a resistance of a first polysilicon resistor 712 and second polysilicon resistor 720 coupled to the current source 704, and may be provided in an approximately equal magnitude to each of the first polysilicon resistor 712 and second polysilicon resistor 720. A first diode 714 coupled to the first polysilicon resistor 712 and a second diode 722 coupled to the second polysilicon resistor 720 each may receive the sensing current. After each of the first diode 714 and second diode 722 receives the sensing current, processing may continue to step 804.

At step 804, a voltage of a measurement node 716 located between the first polysilicon resistor 712 and first diode 714 may be determined (e.g., may be enabled). In some embodiments, the voltage at measurement node 716 may be associated with a measured temperature within the payment reader 22 (e.g., by temperature sensing circuit 706), and may be based on sensing current from current source 704. After a voltage is determined at measurement node 716, processing may continue to step 806.

At step 806, a voltage value of measurement node 716 may be compared with one or more of a plurality of temperature threshold values. For example, in some embodiments, measurement node 716 may be coupled to a temperature comparison circuit 710 for comparing a voltage at measurement node 716 that is associated with a measured temperature within the payment reader 22 with a plurality of temperature thresholds. Each of the plurality of temperature thresholds may correspond to a voltage of one or more threshold nodes 730, 732, 734 and 736 located at a plurality of points in voltage divider circuit 724. In some embodiments, a voltage divider circuit 724 may be arranged in parallel with second polysilicon resistor 720, but other arrangements are possible in other embodiments. Each of selection circuits 740 and 742 may be coupled to one or more threshold nodes 730, 732, 734 and 736 and used to selectively enable a current to pass from one or more threshold nodes 730, 732, 734, and 736 to temperature comparison circuit 710. In this regard, a temperature comparison circuit 710 may compare a voltage (and associated temperature) from measurement node 716 with a voltage associated with one or more of the plurality temperature thresholds from one or more threshold nodes 730, 732, 734 and 736. Processing then may continue to step 808.

At step 808, temperature comparison circuit 710 may determine whether a temperature sensed within payment reader 22 violates a temperature threshold based on the voltage measured at measurement node 716 and voltages of one or more threshold nodes 730, 732, 734 or 736. If a voltage sensed at measurement node 716 exceeds a voltage from one or more threshold nodes 730, 732, 734 or 736 associated with a high temperature threshold of payment reader 22, temperature comparison circuit 710 may determine that a temperature within payment reader 22 sensed by the temperature sensing circuit 706 exceeds the high temperature threshold and processing may continue to step 810. Similarly, if a voltage sensed at measurement node 716 falls below a voltage of one or more threshold nodes 730, 732, 734 or 736 associated with a low temperature threshold of payment reader 22, temperature comparison circuit 710 may determine that a temperature within payment reader 22 sensed by the temperature sensing circuit 706 falls below the low temperature threshold, and processing may continue to step 810. If temperature comparison circuit 710 determines that the voltage sensed at measurement node 716 does not exceed a voltage associated with a high temperature threshold or falls below a voltage associated with a low temperature threshold, temperature comparison circuit 710 may provide an output indicating no tamper attempt has been detected at step 812, and processing may return to step 802.

At step 810, temperature comparison circuit 710 may provide an output indicative of a tamper attempt, such as via output terminals 750 and 752. In some embodiments, temperature comparison circuit 710 may provide an output (high or low signal) at one or more of output terminals 750 and 752 indicating whether a tamper attempt has been detected. In some embodiments, one or both of output terminals 750 and 752 may be coupled to other resources of payment reader 22, such as to anti-tamper circuit 116 or general processing unit 120. In this regard, other resources of payment reader 22 may receive an output indicating a tamper attempt has occurred. Similarly, visible, audible, mechanical, or other outputs may be provided in some embodiments. Other outputs and configurations of temperature detection circuit 710 are possible in other embodiments. Once an output indicative of a tamper attempt has been provided, processing may continue to step 814.

At step 814, payment reader 22 may take action as described herein based on the output received at step 810 (e.g., processing unit 120 may execute anti-tamper instructions 138). For example, in some embodiments, payment reader 22 may provide a tamper notification, such as to merchant device 29, payment server 40 via network 30, or to a user of payment terminal 20. In some embodiments, payment reader 22 may produce audible, visible, or physical alarm signal (output of light, sound, mechanical vibration, a combination thereof, or other output). In some embodiments, payment reader 22 may disable interfaces of payment reader 22 (e.g., to prevent further acquisition or transmission of potentially sensitive data), disable power supply 106 to various resources of payment reader 22 (e.g., any of the interfaces of payment reader 22 or reader chip 100), or remove, erase, delete or wipe information stored in cryptographic memory 128 or general memory 122 or cryptographic memory 128, in response to detection of a tamper attempt. In some embodiments, payment reader 22 may collect tamper attempts that may be identified locally at payment reader 22 or that may be transmitted an external system (e.g., payment server 40) for storage, analysis, and complex or intelligent processing of a tamper event. In some embodiments, such an external analysis may result in a signal being received at general processing unit 120 of payment reader 22, which may shut off power to one or more components of reader chip 100 or payment reader 22 in response to that input. In other embodiments, payment reader 22 may take any other suitable action in response to receiving an output indicate of a tamper attempt at step 810.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system for periodically monitoring an anti-tamper circuit of an electronic payment device, the system comprising:

a battery;

a clock source coupled to the battery, wherein the clock source outputs a periodic signal having a clock source frequency and a clock source duty cycle when power is received from the battery;

one or more tamper detection devices located within the electronic payment device to identify an attempt to tamper with the electronic payment device based on one or more received control signals;

an enabling circuit, comprising:

a clock source input coupled to the clock source to receive the periodic signal;

an oscillator enable input to receive an enabling signal; and an oscillator activation output to provide an oscillator activation signal, wherein the enabling circuit outputs the oscillator activation signal when voltages of both the enabling signal and the periodic signal are greater than an enabling threshold voltage;

an oscillator coupled to the enabling circuit to produce an oscillating signal when the oscillator activation signal is received, wherein a frequency of the oscillating signal is at least an order of magnitude greater than the clock source frequency;

a pulse generator, comprising:
a clock source input coupled to the clock source to receive the periodic signal;
an enabling output to provide the enabling signal, wherein the enabling signal has an enabling signal duty cycle that is less than the clock source duty cycle;
an oscillator input to receive the oscillating signal; and
a tamper control output coupled to the one or more tamper detection devices to provide the one or more control signals to the one or more tamper detection devices based on the oscillating signal.

2. The system of claim 1, wherein the one or more control signals comprise at least one voltage source control signal and at least one monitoring control signal.

3. The system of claim 1, wherein the one or more tamper detection devices comprise a temperature tamper detection device and a physical tamper detection device.

4. The system of claim 1, wherein each of the enabling circuit, the oscillator, and the pulse generator are operational only when a voltage of the periodic signal exceeds an operational threshold voltage.

5. The system of claim 1, wherein the enabling signal duty cycle is less than 51 percent of the clock source duty cycle.

6. The system of claim 1, wherein the frequency of the oscillating signal is at least 25 times greater than the frequency of the periodic signal.

7. A system for monitoring an anti-tamper circuit, the system comprising:
a clock source, wherein the clock source outputs a periodic signal having a clock source frequency;
an enabling circuit, comprising:
a clock source input coupled to the clock source to receive the periodic signal;
an oscillator enable input to receive an enabling signal; and
an oscillator activation output to provide an oscillator activation signal, wherein the enabling circuit outputs the oscillator activation signal based on the voltages of both the enabling signal and the periodic signal;
an oscillator coupled to the enabling circuit to produce an oscillating signal when the oscillator activation signal is received by the oscillator;
a pulse generator, comprising:
a clock source input coupled to the clock source to receive the periodic signal;
an enabling output to provide the enabling signal during a portion of the periodic signal;
an oscillator input to receive the oscillating signal; and
a tamper control output to communicate with one or more tamper detection devices based on the oscillating signal.

8. The system of claim 7, further comprising a battery coupled to the clock source, wherein the clock source outputs the periodic signal when power is received from the battery.

9. The system of claim 7, wherein the periodic signal has a clock source duty cycle, and wherein the portion of the periodic signal is a portion of clock source duty cycle.

10. The system of claim 7, further comprising the one or more tamper detection devices, wherein the one or more tamper detection devices are located within the electronic payment device to identify an attempt to tamper with the electronic payment device based on the communication of the tamper control output.

11. The system of claim 10, wherein the one or more tamper detection devices comprise a temperature tamper detection device and a physical tamper detection device.

12. The system of claim 7, wherein the tamper control output communicates with the one or more tamper detection devices based on one or more control signals, and wherein the one or more control signals are based on the oscillating signal.

13. The system of claim 12, wherein the one or more control signals comprise at least one voltage source control signal and at least one monitoring control signal.

14. The system of claim 7, wherein a frequency of the oscillating signal is at least an order of magnitude greater than the clock source frequency.

15. The system of claim 14, wherein the frequency of the oscillating signal is at least 25 times greater than the frequency of the periodic signal.

16. They system of claim 7, wherein the enabling signal has an enabling signal duty cycle that is less than a clock source duty cycle.

17. The system of claim 16, wherein the enabling signal duty cycle is less than 51 percent of the clock source duty cycle.

18. The system of claim 7, wherein each of the enabling circuit, the oscillator, and the pulse generator are operational only when a voltage of the periodic signal is greater than an operational threshold voltage.

19. A method for monitoring an anti-tamper circuit, the method comprising:
providing, from a clock source, a periodic signal having a clock source frequency;
receiving, at a first clock source input of an enabling circuit coupled to the clock source, the periodic signal;
receiving, at a second clock source input of a pulse generator coupled to the clock source, the periodic signal;
providing, at an enabling output of the pulse generator, an enabling signal during a portion of the periodic signal;
receiving, at an oscillator enable input of the enabling circuit, the enabling signal;
providing, at an oscillator activation output of the enabling circuit, an oscillator activation signal based on the voltages of both the enabling signal and the periodic signal;
producing, at an oscillator coupled to the enabling circuit, an oscillating signal when the oscillator activation signal is received by the oscillator;
receiving, at an oscillator input of the pulse generator, the oscillating signal; and
communicating, from a tamper control output of the pulse generator, with one or more tamper detection devices based on the oscillating signal.

20. The method of claim 19, further comprising outputting, from the clock source, the periodic signal when power is received from a battery coupled to the clock source.

21. The method of claim 19, wherein the periodic signal has a clock source duty cycle, and wherein the portion of the periodic signal is a portion of clock source duty cycle.

22. The method of claim 19, further comprising identifying, at the one or more tamper detection devices located within the electronic payment device, an attempt to tamper with the electronic payment device based on one or more received control signals.

23. The method of claim 22, wherein the one or more tamper detection devices comprise a temperature tamper detection device and a physical tamper detection device.

24. The method of claim 19, wherein communicating with the one or more temperature devices comprises providing one or more control signals to the one or more tamper detection devices, and wherein the one or more control signals are based on the oscillating signal.

25. The method of claim 24, wherein the one or more control signals comprise at least one voltage source control signal and at least one monitoring control signal.

26. The method of claim 19, wherein a frequency of the oscillating signal is at least an order of magnitude greater than the clock source frequency.

27. The method of claim 26, wherein the frequency of the oscillating signal is at least 25 times greater than the frequency of the periodic signal.

28. They method of claim 19, wherein the enabling signal has an enabling signal duty cycle that is less than a clock source duty cycle.

29. The method of claim 28, wherein the enabling signal duty cycle is less than 51 percent of the clock source duty cycle.

30. The method of claim 19, further comprising operating the enabling circuit, the oscillator, and the pulse generator only when a voltage of the periodic signal is greater than an operational threshold voltage.

* * * * *